United States Patent
Dagani et al.

(10) Patent No.: US 10,616,451 B2
(45) Date of Patent: Apr. 7, 2020

(54) IMAGE PROCESSING DEVICES AND METHODS FOR OPERATING THE SAME

(71) Applicant: Samsung Electronics Co., Ltd., Suwon-si, Gyeonggi-do (KR)

(72) Inventors: Nir Dagani, Ramat Gan (IL); Nathan Henri Levy, Ramat Gan (IL); Yuri Friedman, Ramat Gan (IL); Dor Barber, Ramat Gan (IL)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 500 days.

(21) Appl. No.: 15/397,837

(22) Filed: Jan. 4, 2017

(65) Prior Publication Data

US 2018/0189931 A1   Jul. 5, 2018

(51) Int. Cl.
*H04N 5/217* (2011.01)
*H04N 5/367* (2011.01)

(52) U.S. Cl.
CPC ............ *H04N 5/217* (2013.01); *H04N 5/367* (2013.01)

(58) Field of Classification Search
CPC .. G06T 5/00–002; H04N 5/217; H04N 5/367; H04N 5/357; H04N 5/365
See application file for complete search history.

(56) References Cited

U.S. PATENT DOCUMENTS

| | | | | |
|---|---|---|---|---|
| 4,783,839 A | * | 11/1988 | Bamber | G01S 7/412 348/163 |
| 5,876,342 A | * | 3/1999 | Chen | G06T 7/254 128/916 |
| 6,468,218 B1 | * | 10/2002 | Chen | A61B 6/469 128/916 |
| 2005/0033166 A1 | * | 2/2005 | Hastings | G01S 7/52077 600/437 |
| 2005/0041837 A1 | * | 2/2005 | Fan | G06T 7/0012 382/103 |
| 2006/0012798 A1 | * | 1/2006 | Jones | G01B 11/002 356/512 |
| 2007/0071292 A1 | * | 3/2007 | Rao | G06T 5/002 382/128 |
| 2008/0069366 A1 | * | 3/2008 | Soulodre | G01H 7/00 381/63 |
| 2008/0181476 A1 | * | 7/2008 | Aysal | G06K 9/40 382/128 |
| 2013/0018265 A1 | * | 1/2013 | Kim | A61B 8/145 600/443 |
| 2014/0193095 A1 | * | 7/2014 | Choe | G06T 5/002 382/274 |
| 2015/0193962 A1 | * | 7/2015 | Ohuchi | A61B 6/4417 345/427 |
| 2018/0189931 A1 | * | 7/2018 | Dagani | H04N 5/367 |

* cited by examiner

*Primary Examiner* — Sean T Motsinger
(74) *Attorney, Agent, or Firm* — Harness, Dickey & Pierce, P.L.C.

(57) ABSTRACT

A method includes determining blocks of speckle-free regions in a first image; storing information about the blocks in a memory; and processing at least one second image based on the stored information.

20 Claims, 5 Drawing Sheets

IMAGE PROCESSING DEVICES AND METHODS FOR OPERATING THE SAME

BACKGROUND

Field

At least one example embodiment relates to image processing devices and/or image processing methods.

Description of Related Art

In general, speckles may refer to errors (e.g., artefacts) in an image that occur, for example, during image capture by an image sensor. These errors may occur as a result of dust or dirt on the image sensor or as a result of other factors that distort a captured image. Thus, in order to improve image quality, conventional image processing techniques include a process referred to as despeckling, in which each pixel of a captured image is examined to detect and correct speckles. This type of an examination on a per-pixel basis is costly in terms of power consumption for a device performing the image processing. Accordingly, it is desired to reduce power consumption associated with speckle detection and correction during image processing.

SUMMARY

According to at least some example embodiments of the inventive concepts, a method includes determining blocks of speckle-free regions in a first image; storing information about the blocks in a memory; and processing at least one second image based on the stored information.

According to at least some example embodiments of the inventive concepts, an image processing circuit includes a memory including computer readable instructions; and a processor configured to execute the computer readable instructions to determine blocks of speckle-free regions in a first image, store information about the blocks in the memory, and process at least one second image based on the stored information.

BRIEF DESCRIPTION OF THE DRAWINGS

The above and other aspects and features of the inventive concepts will become more apparent by describing in detail example embodiments thereof with reference to the attached drawings, in which.

DETAILED DESCRIPTION OF EXAMPLE EMBODIMENTS

Figure 1:
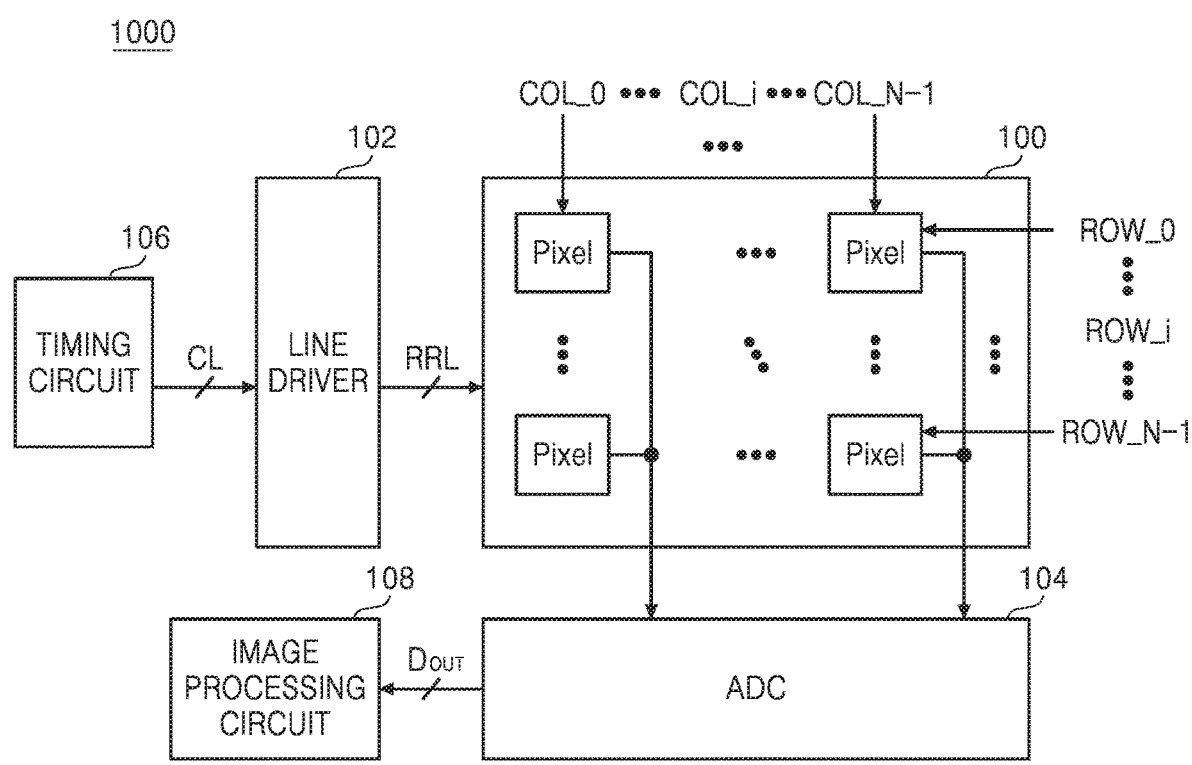
FIG. 1 shows a conventional levels-to-bits mapping scheme for writing data to 3 bit/cell memory cells and a reading scheme for reading the data from the memory cells.

Inventive concepts will now be described more fully with reference to the accompanying drawings, in which example embodiments of are shown. These example embodiments are provided so that this disclosure will be thorough and complete, and will fully convey inventive concepts of to those skilled in the art. Inventive concepts may be embodied in many different forms with a variety of modifications, and a few embodiments will be illustrated in drawings and explained in detail. However, this should not be construed as being limited to example embodiments set forth herein, and rather, it should be understood that changes may be made in these example embodiments without departing from the principles and spirit of inventive concepts, the scope of which are defined in the claims and their equivalents. Like numbers refer to like elements throughout. In the drawings, the thicknesses of layers and regions are exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., electronic imaging systems, image processing systems, digital point-and-shoot cameras, personal digital assistants (PDAs), smartphones, tablet personal computers (PCs), laptop computers, etc.). Such existing hardware may include one or more Central Processing Units (CPUs), digital signal processors (DSPs), application-specific-integrated-circuits (ASICs), field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible or non-transitory machine readable mediums for storing information. The term "computer-readable medium" may include, but is not limited to, portable or fixed storage devices, optical storage devices, and various other tangible or non-transitory mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "includes", "including", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "and/or" includes any and all combinations of one or more of the associated listed items. Expressions such as "at least one of," when preceding a list of elements, modify the entire list of elements and do not modify the individual elements of the list.

FIG. 1 is a block diagram of an image sensor 1000 according to an example embodiment. In the example shown in FIG. 1, the image sensor 1000 is a CMOS image sensor. However, example embodiments should not be limited to this example.

Referring to FIG. 1, the image sensor 1000 includes: a timing circuit 106; a line driver 102; a pixel array 100; an analog-to-digital converter (ADC) 104; and an image processing circuit 108.

The timing circuit 106 controls the line driver 102 through one or more control lines CL. In one example, the timing circuit 106 causes the line driver 102 to generate a plurality of transfer pulses (e.g., reset/shutter, sampling, readout, and/or selection) to control exposure and readout of the active pixel sensors (also sometimes referred to herein as pixels or pixel sensors) in the pixel array 100. As will be discussed in more detail below, according to at least some example embodiments, the timing circuit 106 calculates and sets an exposure time (or set of exposure times or sets of exposure times) for each sub-array of the pixel array 100 independently of at least some others of the sub-arrays of the pixel array 100 such that at least some of the sub-arrays are assigned different (and independent) exposure times or sets of exposure times.

Still referring to FIG. 1, the line driver 102 outputs transfer pulses to control circuitry of the pixel array 100 over a plurality of read and reset lines RRL. The read and reset lines RRL may include transfer lines, sampling lines, reset lines, and selection lines.

The pixel array 100 includes a plurality of pixels arranged in an array of rows ROW_0, . . . , ROW_i, . . . , ROW_N−1 and columns COL_0, . . . , COL_i, . . . , COL_N−1. As discussed herein, rows and columns may be collectively referred to as lines. Each of the plurality of read and reset lines RRL corresponds to a line of pixels in the pixel array 100 having, for example, a Bayer color pattern. In the example embodiment shown in FIG. 1, each pixel is an active-pixel sensor (APS), and the pixel array 100 is an APS array. However, example embodiments should not be limited to this example.

The pixel array 100 outputs pixel data (e.g., voltages) from each line of the pixel array 100 to the ADC 104 during respective readout periods.

The ADC 104 converts the output pixel data (e.g., voltages) from each line of readout pixels into a digital signal (also sometimes referred to herein as image data). The ADC 104 outputs the image data Dour to the image processing circuit 108.

The image processing circuit 108 performs further processing to generate an image. The generated image may be displayed on a display device (e.g., monitor, etc.) and/or stored in a memory (not shown). The display device and/or the memory may be coupled to the image processing circuit 108.

The image sensor 1000 may expose the pixels in the pixel array 100 using a global shutter or a rolling shutter. As is known, global shutter is a method of image capture in which a snapshot of an entire scene is taken by applying transfer pulses to the pixels concurrently. On the other hand, rolling shutter is a method for image capture in which transfer pulses are applied sequentially to lines of pixels that are scanned rapidly either vertically or horizontally.

According to at least some example embodiments, the image sensor shown in FIG. 1 may have a stack structure in which the APS array 100 is arranged on a top side of a wafer or substrate, and coupled to the control circuitry arranged on a bottom side of the wafer or substrate. In at least one example embodiment, the control circuitry may include a plurality control circuits, wherein at least one of the plurality of control circuits corresponds to a group of pixel sensors in the APS array 100. In one example, each of the plurality of control circuits may correspond to a group of pixel sensors in the APS array 100.

According to at least some example embodiments, each of the plurality of control circuits includes at least one transfer gate controller, which controls application of reset and readout transfer pulses to pixels in the pixel array 100. The application of a reset transfer pulse to a pixel initiates the exposure time (or period) for that pixel, and the application of a readout transfer pulse ends the exposure time (or period) for that particular pixel. Thus, the plurality of control circuits control the moment at which an exposure time for a given pixel begins and ends. Each of the plurality of control circuits controls application of the reset and readout transfer pulses by controlling opening and closing of pixel transfer gates for pixels of the pixel array 100.

Figure 2:
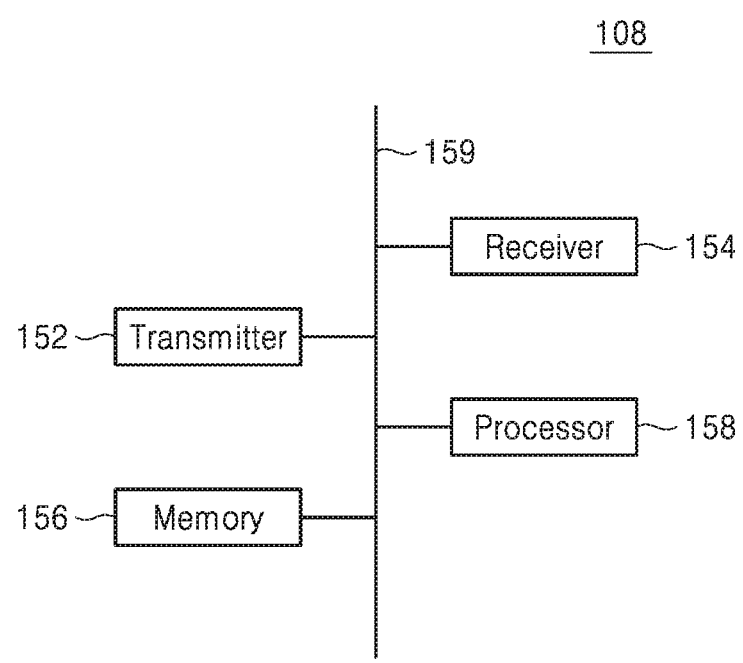
FIG. 2 is an example structure of an image processing circuit according to at least one example embodiment.

FIG. 2 is an example structure of an image processing circuit according to at least one example embodiment.

FIG. 2 is a diagram illustrating an example structure of the image processing circuit 108 in FIG. 1 according to an example embodiment. Referring to FIG. 2B, image processing circuit 108 may include, for example, a data bus 159, a transmitter 152, a receiver 154, a memory 156, and a processor 158.

The transmitter 152, receiver 154, memory 156, and processor 158 may send data to and/or receive data from one another using the data bus 159. The transmitter 152 is a device that includes hardware and any necessary software for transmitting signals including, for example, data signals and control signals to the memory 120 and/or a host (not shown).

The receiver 154 is a device that includes hardware and any necessary software for receiving signals including, for example, data signals and control signals to and from the memory 156 and a host (not shown).

The memory 156 may be any device capable of storing data including magnetic storage, flash storage, etc.

The processor 158 may be any device capable of processing data including, for example, a special purpose processor configured to carry out specific operations based on input data, or capable of executing instructions included in computer readable code stored on the memory 156. For example, it should be understood that the modifications and methods described below may be stored on the memory 156 and implemented by the processor 158.

Further, it should be understood that the below modifications and methods may be carried out by one or more of the above described elements of the image processing circuit 108. For example, the receiver 154 may carry out steps of "receiving," "acquiring," and the like; transmitter 152 may carry out steps of "transmitting," "outputting," "sending" and the like; processor 158 may carry out steps of "determining," "generating", "correlating," "calculating," and the like; and memory 156 may carry out steps of "storing," "saving," and the like.

Figure 3:
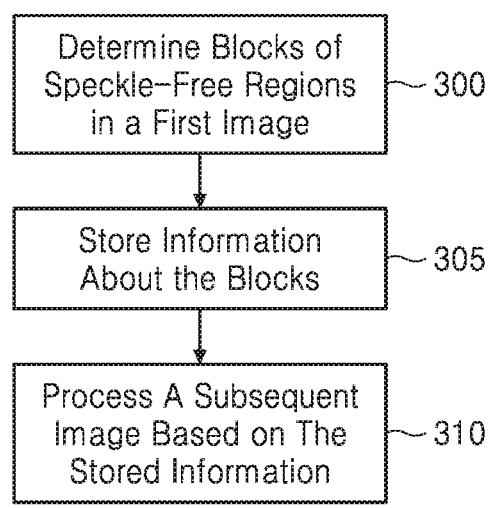
FIG. 3 is a flow chart illustrating example operations of the image processing circuit in FIG. 2 according to at least one example embodiment.

FIG. 3 is a flow chart illustrating example operations of the image processing circuit in FIG. 2 according to at least one example embodiment.

In operation 300, the image processing circuit 108 may determine blocks of speckle-free regions in a first image. The image processing circuit 108 may determine the speckle-free regions of the first image as regions that are not distorted by factors associated with the image sensor 1000, such as dust or dirt on the image sensor 1000. The image processing circuit 108 may determine the speckle-free regions of the first image according to any known or to be developed method for determining speckle-free regions in an image. The first image may be an image captured by an image sensor, for example, the image sensor 1000 of FIG. 1. The regions in the first image may correspond to the pixels shown in FIG. 1. However, example embodiments are not limited thereto. For example, the regions may correspond to groups of pixels or even sub-pixels within the pixels.

Each determined block may correspond to one or more of the regions. For example, the image processing circuit 108 may determine the blocks such that each block includes consecutive regions (e.g., pixels in a row and/or column) within the first image. Further, the image processing circuit 108 may determine the blocks of speckle-free regions such that a size of each block exceeds a threshold size. The threshold size may be user defined and/or a design parameter based on empirical evidence. The threshold size may be set as a desired number of the regions. For example, if the regions correspond to pixels in the image sensor 1000, then the threshold size may be set to a number of consecutive pixels in a row and/or column of the image sensor 1000. Conditions under which the threshold size may change are described below with reference to FIGS. 4 and 5.

In operation 305, the image processing circuit 108 may store information about the blocks in a memory, for example, the memory 156 in FIG. 2. The stored information may include information regarding locations and sizes of the blocks within the first image, a count value associated with each of the blocks. The count value may indicate whether a block determined in operation 300 is also a valid block, as will be described below with reference to FIG. 4. The stored information may be stored in the form of a table (e.g., a lookup table (LUT)). Roles of the stored information are described in more detail below with reference to FIGS. 4 and 5.

In operation 310, the image processing circuit 108 may process a subsequent image (e.g., a second image, a third image, a fourth image, etc., which may also be referred to as at least one second image) based on the stored information. For example, the image processing circuit 108 may use the stored information to determine whether to skip a despeckling operation for an area of the subsequent image, thereby reducing power consumption of the image processing circuit 108. The subsequent image may be an image captured by the image sensor 1000 subsequent to capturing the first image. The area of the subsequent image may correspond to one of the pixels shown in FIG. 1. However, example embodiments are not limited thereto. For example, the area may correspond to groups of pixels or even sub-pixels within the pixels. Operation 310 is discussed in more detail below with reference to FIG. 4.

Figure 4:
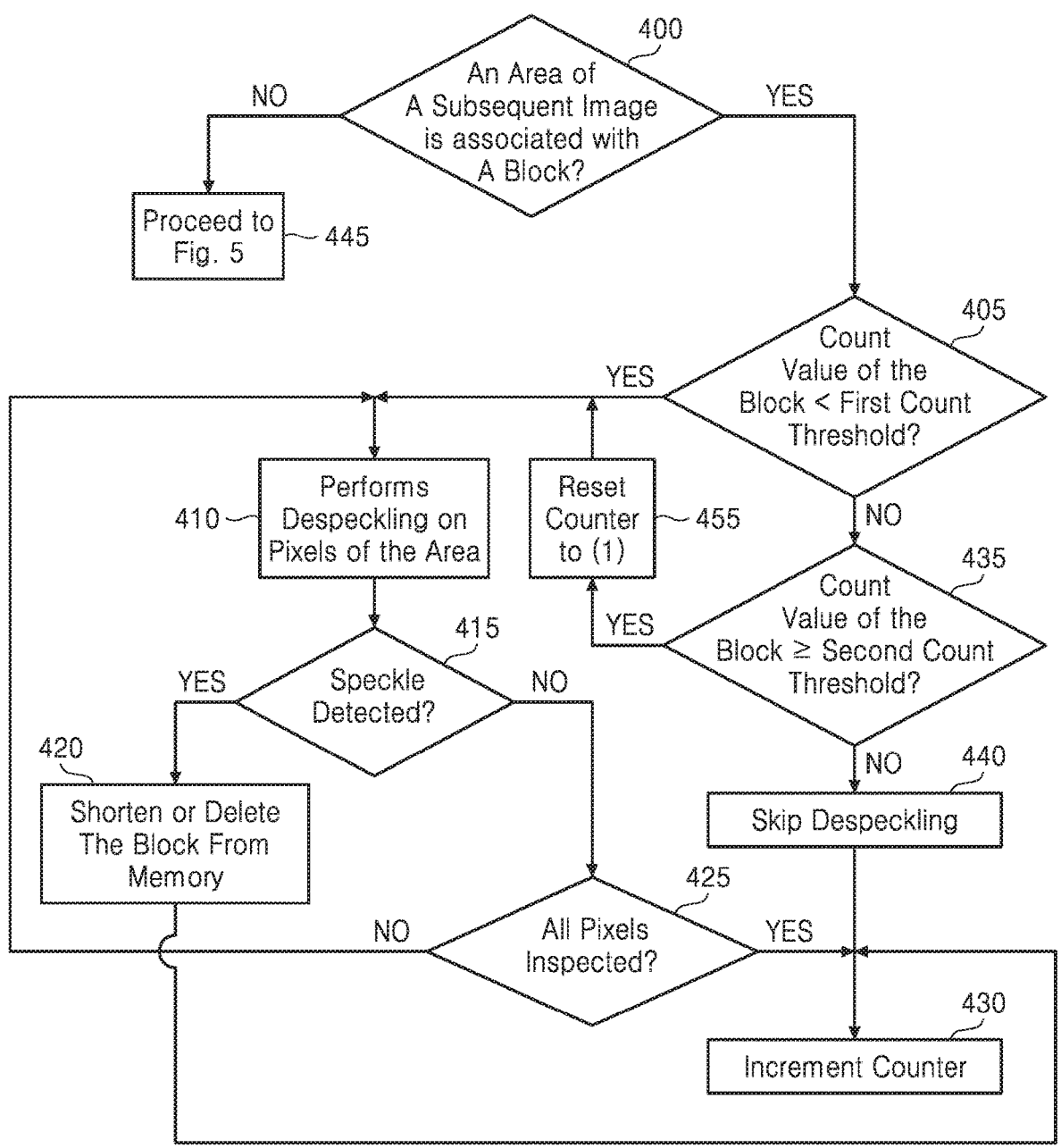
FIG. 4 is a flow chart illustrating example operations of the image processing circuit in FIG. 2 according to at least one example embodiment.
Figure 5:
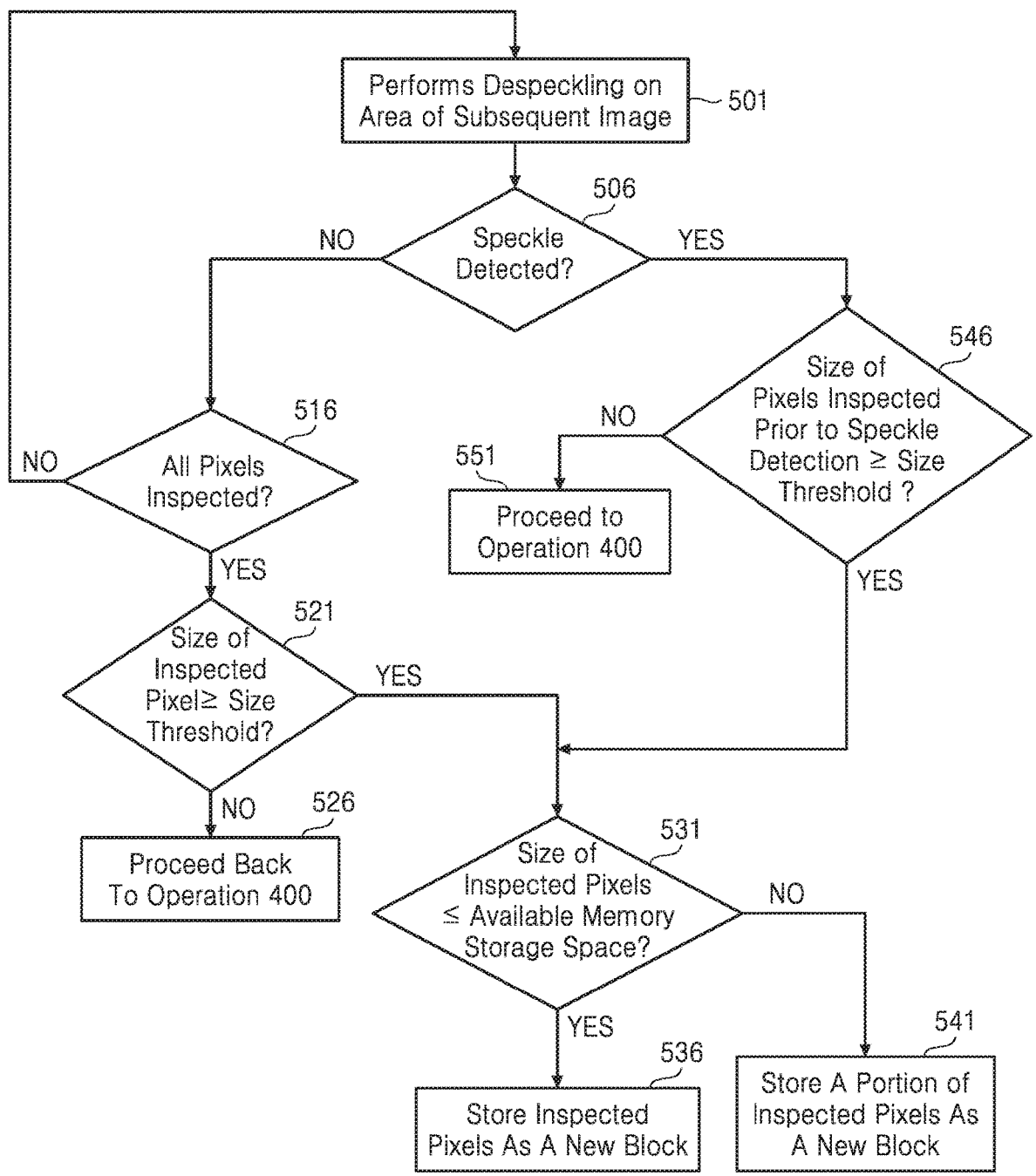
FIG. 5 is a flow chart illustrating example operations of the image processing circuit in FIG. 2 according to at least one example embodiment.

FIG. 4 is a flow chart illustrating example operations of the image processing circuit in FIG. 2 according to at least one example embodiment. For example, FIG. 4 illustrates additional operations associated with processing a subsequent image in operation 310 in FIG. 3. While FIGS. 4 and 5 will be described with respect to a single subsequent image, example embodiments are not limited thereto. Accordingly, the process of FIGS. 4 and 5 is equally applicable to any number of subsequent images.

In operation 400, the image processing circuit 108 determines whether an area of the subsequent image is associated with a block of the first image from among the blocks of the first image determined in operation 300 and stored in the memory 156 at operation 305. For example, the image processing circuit 108 makes this determination using the locations and/or sizes of the blocks stored as part of the information in operation 305. The area may correspond to one or more pixels of the subsequent image. If the area of the subsequent image and each region of the first image are single pixels, then the image processing circuit 108 performs operation 400 by comparing a location of the area in the subsequent image to a location of a corresponding region in the first image. If the location of the area in the subsequent image has a corresponding location of a region in the first image that is in a block (i.e., coordinates of the area and the region are the same within the first image and subsequent image, respectively), then the image processing circuit 108 determines that the area of the subsequent image is associated with that block.

If the area of the subsequent image is associated with a block of the first image, in operation 405, the image processing circuit 108 determines whether a count value (which is stored in the memory 156 as described above with reference to operation 305) of the block with which the area of the subsequent image is associated is less than a first count threshold. The first count threshold may be user defined and/or a design parameter based on empirical evidence. In one example embodiment, the first count threshold indicates a minimum number of times that any block should be checked for speckles before being determined as a valid block to be used for determining whether a despeckling process (i.e., speckle detection and correction) should be performed on a corresponding area in a subsequent image or not.

For example, if the first count threshold is set to 3, then the image processing circuit 108 performs despeckling on the block for at least 3 times (e.g., once at operation 300 with respect to the first image and at least two additional times with respect to area(s) corresponding to the block in subsequent images).

If at operation 405, the image processing circuit 108 determines that the count value of the block in the first image is less than the first count threshold, then at operation 410, the image processing circuit 108 performs despeckling (e.g., detection and/or correction of speckles) on the area of the subsequent image. In one example embodiment, the image processing circuit 108 performs the despeckling on each pixel of the area of the subsequent image. After checking each pixel of the area, at operation 415, the image processing circuit 108 determines whether a speckle is detected.

If at operation 415 the image processing circuit 108 detects a speckle, then at operation 420, the image processing circuit 108 shortens or deletes the block stored in the memory 156, as will be described below. Thereafter, the process proceeds to operation 430, where the count value of the block is increment, as will be described below.

In one example embodiment, at operation 420, the image processing circuit 108 one of deletes and shortens the block (i.e., the block to which the area of the subsequent image corresponds as determined at operation 400 described above) stored in the memory 156. For example, the image processing circuit shortens the block if the shortened block is within a range of the threshold size used to initially determine the block in operation 300 of FIG. 3 as described above. Alternatively, the image processing circuit 108 may delete the block and its associated information from the memory 156 if the shortened block is not within the range of the threshold size.

Referring back to operation 415, after checking each pixel of the area and determining that no speckle has been detected, at operation 425, the image processing circuit 108 determines whether all pixels in the area have been inspected for speckles or not.

If at operation 425, the image processing circuit 108 determines that more pixels remain to be checked, the process reverts back to operation 410 and the image processing circuit 108 repeats operations 410 to 425. However, if at operation 425, the image processing circuit 108 determines that all pixels in the area have been checked for speckle, then at operation 430, the image processing circuit 108 increments the count value of the block (e.g., increments the value of the block of the first image with which the area is associated, as determined at operation 400, by one (1)).

Referring back to operation 405, if the image processing circuit 108 determines that the count value is equal to or greater than the first count threshold, thereafter at operation 435, the image processing circuit 108 determines whether the count value is equal to or greater than a second count threshold. The second count threshold may be user defined and/or a design parameter based on empirical evidence. In one example embodiment, the second count threshold indicates a threshold above which, a block is to be checked for speckles again regardless of whether the block was previously determined to be valid or not. In other words, the second count threshold is a value above which a block is no longer valid. In one example embodiment, the second count threshold ensures that no block goes unchecked for speckles for too long.

For example, if the second count threshold is set to 8, then the image processing circuit 108 performs despeckling on the block once the count value of the block reaches 8, regardless of whether the block was previously determined as a valid and speckle free block or not.

If at operation 435, the image processing circuit 108 determines that the count value of the block is not greater than or equal to (i.e. is less than) the second count threshold, then at operation 440, the image processing circuit 108 skips performing despeckling on the area of the subsequent image. Here, power consumption of the image processing circuit 108 is reduced because the despeckling operation (i.e., speckle detection and correction) is skipped for the area of the subsequent image. Thereafter, the process proceeds to operation 430, where the image processing circuit 108 increments the count value of the block by 1, as described above.

However, if at operation 435, the image processing circuit 108 determines that the count value of the block is equal to or greater than the second count threshold, then at operation 455, the image processing circuit 108 resets the count value to 1 for the block. Thereafter, the process reverts back to operation 410 and the image processing circuit 108 repeats the operations 410 through 445. In other words, if the count value of the block is equal to or greater than the second count threshold, the image processing circuit 108 treats the block as invalid (similar to when the image processing circuit 108 determines the count value to be less the first count threshold at operation 405) and performs despeckling.

Referring back to operation 400, if the image processing circuit 108 determines that the area in the subsequent image is not associated with a stored block of the first image, then at operation 445, the process proceeds to that of FIG. 5, as will be described below.

FIG. 5 is a flow chart illustrating example operations of the image processing circuit in FIG. 2 according to at least one example embodiment.

At operation 501, the image processing circuit 108 performs a despeckling process on pixels of the area of the subsequent image, similar to that performed at operation 410 described above.

At operation 506, the image processing circuit 108 determines, after checking each pixel of the area, whether a speckle is detected or not. If no speckle is detected, then at operation 516, the image processing circuit 108 determines whether all pixels of the area of the subsequent image have been inspected for speckles. If not, then process reverts back to operation 501.

However, if the image processing circuit 108 determines at operation 516 that all the pixels of the area of the subsequent image are inspected, then at operation 521, the image processing circuit 108 determines whether a size of the pixels inspected for speckles (the size of the pixels of the area of the subsequent image or in other words the size of the area of the subsequent image) is equal to or greater than a size threshold. The size threshold may be user defined and/or a design parameter based on empirical evidence. In one example embodiment, the size threshold is a threshold above which the checked area is determined to be large enough for storage as a valid block in the memory 156.

If at operation 521, the image processing circuit 108 determines that the size of the inspected pixels of the area of the subsequent image does not exceed the size threshold, then at operation 526, the process reverts back to operation 400 of FIG. 4, where the image processing circuit 108 repeats the process of FIG. 4 and/or FIG. 5 for another area of the subsequent image.

However, if at operation 521, the image processing circuit 108 determines that the size of the inspected pixels of the area of the subsequent image exceeds the size threshold, then at operation 531, the image processing circuit 108 determines whether the size of the inspected pixels is less than or equal to the available storage space on the memory 156. If the image processing circuit 108 determines that the size of the inspected pixels is less than or equal to the available storage space on the memory 156, then at operation 536 the image processing circuit 108 stores the entirety of the inspected pixels as a new block in the memory 156. However, if the image processing circuit 108 determines that the size of the inspected pixels is greater than the available storage space on the memory 156, then at operation 541 the image processing circuit 108 stores a portion of the inspected pixels that is equal to the available storage space on the memory 156, as a new block in the memory 156.

Referring back to operation 506, if the image processing circuit 108 detects a speckle for a pixel of the area of the subsequent image, then at operation 546, the image processing circuit 108 determines whether a size of the pixels inspected prior to the detection of the speckle is equal to or greater than a size threshold, which may be the same as the size threshold described above with reference to operation 521. If the image processing circuit 108 determines that the size of the pixels inspected prior to the detection of the speckle to be equal to or greater than the size threshold, then the process proceeds to operation 531, where the image processing circuit 108 repeats the operations 531 to 541. However, if the image processing circuit 108 determines that the size of the pixels inspected prior to the detection of the speckle is less than the size threshold, then at operation 551, the process reverts back to operation 400 of FIG. 4, where the image processing circuit 108 repeats the process of FIG. 4 and/or FIG. 5 for another area of the subsequent image.

In view of the above description, it should be understood that at least one example embodiment may provide for image processing methods that conserve power by skipping speckle detection and correction operations for designated areas of an image while maintaining a desired image quality. As the above described operations are performed repeatedly, parameters that guide the operations (e.g., thresholds and stored information) may be updated or adjusted (e.g., automatically updated or adjusted) so that the power reduction effects and the image quality continue to improve and/or are optimized.

While example embodiments have been shown and described above, it will be apparent to those skilled in the art that modifications and variations could be made without departing from the spirit and scope of the inventive concepts as defined by the appended claims.

What is claimed is:

1. A method, comprising:
   determining blocks of speckle-free regions in a first image, each of the blocks including a plurality of pixels;
   storing information about the blocks in a memory; and
   processing at least one second image based on the stored information,
   wherein,
   the stored information includes a count value associated with each of the blocks, and
   the processing includes skipping despeckling for an area of the at least one second image associated with a block from among the blocks based on the count value of the block.

2. The method of claim 1, wherein the determining determines the blocks such that a size of each block exceeds a threshold size.

3. The method of claim 2, wherein
   the stored information includes locations of the blocks, and
   the processing includes determining whether an area of the at least one second image is associated with a block from among the blocks based on the locations.

4. The method of claim 3, wherein,
   if the area is associated with the block, the processing includes determining whether the count value is greater than or equal to a first count threshold and less than a second count threshold.

5. The method of claim 4, wherein the processing includes skipping despeckling for the area if the count value is greater than or equal to the first count threshold and less than the second count threshold.

6. The method of claim 4, wherein the processing includes,
   performing despeckling on the area if the count value is at least one of less than the first count threshold and greater than or equal to the second count threshold, and
   one of deleting and shortening the block if the area includes a speckle.

7. The method of claim 6, wherein the processing includes incrementing the count value if the area does not include a speckle.

8. The method of claim 3, wherein the processing includes performing despeckling of the area if the area is not associated with any of the blocks.

9. The method of claim 8, wherein upon detecting a speckle with respect to at least one pixel of the area, the processing further includes,
   determining whether a size of pixels of the area inspected prior to the detection of the at least one speckle is equal to or greater than a size threshold, and storing at least a portion of the inspected pixels as a new block, the portion corresponding to an amount of free storage space available on the memory.

10. The method of claim 8, wherein upon completing the despeckling, the method further includes, determining whether a size of pixels inspected as part of the despeckling is equal to or greater than a size threshold, and storing at least a portion of the inspected pixels as a new block, the portion corresponding to an amount of free storage space available on the memory.

11. An image processing circuit, comprising:

a memory including computer readable instructions; and a processor configured to execute the computer readable instructions to:

determine blocks of speckle-free regions in a first image, each of the blocks including a plurality of pixels, store information about the blocks in the memory, and process at least one second image based on the stored information, wherein the stored information includes a count value associated with each of the blocks, and the processor is configured to process the at least one second image by skipping despeckling for an area of the at least one second image associated with a block from among the blocks based on the count value of the block.

12. The image processing circuit of claim 11, wherein the processor is configured to determine the blocks such that a size of each block exceeds a threshold size.

13. The image processing circuit of claim 12, wherein the stored information includes locations of the blocks, and the processor is configured to process the at least one second image by determining whether the area of the at least one second image is associated with a block from among the blocks based on the locations.

14. The image processing circuit of claim 13, wherein, if the area is associated with the block, the processor is configured to process the at least one second image by determining at least one of whether the count value is greater than or equal to a first count threshold and less than a second count threshold.

15. The image processing circuit of claim 14, wherein the processor is configured to process the at least one second image by skipping despeckling for the area if the count value is greater than or equal to the first count threshold and less than the second count threshold.

16. The image processing circuit of claim 14, wherein the processor is configured to process the at least one second image by, performing despeckling on the area if the count value is at least one of less than the first count threshold and greater than or equal to the second count threshold, and one of deleting and shortening the block if the area includes a speckle.

17. The image processing circuit of claim 16, wherein the processor is configured to process the at least one second image by incrementing the count value if the area does not include a speckle.

18. The image processing circuit of claim 13, wherein the processor is configured to process the at least one second image by performing despeckling of the area if the area is not associated with any of the blocks.

19. The image processing circuit of claim 18, wherein upon detecting a speckle with respect to at least one pixel of the area, the processing further includes, determining whether a size of pixels of the area inspected prior to the detection of the at least one speckle is equal to or greater than a size threshold, and storing at least a portion of the inspected pixels as a new block, the portion corresponding to an amount of free storage space available on the memory.

20. The image processing circuit of claim 18, wherein the processor is configured such that, upon completing the despeckling, the processor, determines whether a size of pixels inspected as part of the despeckling is equal to or greater than a size threshold, and stores at least a portion of the inspected pixels as a new block, the portion corresponding to an amount of free storage space available on the memory.

\* \* \* \* \*